US006178575B1

(12) United States Patent
Harada

(10) Patent No.: US 6,178,575 B1
(45) Date of Patent: Jan. 30, 2001

(54) STRETCHER MOUNTING UNIT

(75) Inventor: Junichi Harada, Chino (JP)

(73) Assignees: S. N. Seiki Co., Ltd., Nagano-ken (JP); Kyowa Denko Co., Ltd., Shizuoka-ken (JP)

( * ) Notice: Under 35 U.S.C. 154(b), the term of this patent shall be extended for 0 days.

(21) Appl. No.: 09/300,385

(22) Filed: Apr. 27, 1999

(30) Foreign Application Priority Data

Oct. 9, 1998 (JP) ................................................ 10-287505

(51) Int. Cl.[7] ............................... A61G 1/02; B60K 7/00; B60K 1/02

(52) U.S. Cl. .................................... 5/600; 5/86.1; 180/11; 180/16

(58) Field of Search ......................... 5/600, 86.1; 180/11, 180/15, 16, 65.1, 342

(56) References Cited

U.S. PATENT DOCUMENTS 2,495,573 * 1/1950 Duke ...................................... 180/11
3,137,869 * 6/1964 Johnson .................................. 5/86.1
3,199,621 * 8/1965 Seaman .................................. 180/11
3,349,862 * 10/1967 Shirey, Jr. .............................. 180/15
3,380,546 * 4/1968 Rabjohn ................................. 180/15
5,083,625 * 1/1992 Bleicher .............................. 180/65.1
5,163,189 * 11/1992 DeGray ................................... 5/86.1
5,337,845 * 8/1994 Foster et al. ..................... 180/65.1 X
5,445,233 * 8/1995 Fernie et al. ..................... 180/65.1 X
5,758,371 * 6/1998 VanDyke et al. ........................ 5/86.1
6,065,557 * 5/2000 Von Keyserling ............... 180/342 X

* cited by examiner

*Primary Examiner*—Michael F. Trettel
(74) *Attorney, Agent, or Firm*—Wenderoth, Lind & Ponack, L.L.P.

(57) ABSTRACT

A stretch mounting unit includes a unit body detachably mounted on a stretcher, a drive device attached to the unit body for providing an output, a center shaft for receiving the output of the drive device, a coupling that couples the drive device and the center shaft for transmitting the output of the drive device to the center shaft, a roller pressed on the center shaft to produce torque, a carrier swingably disposed on the center shaft, a pair of wheels rotatably mounted on the carrier and rotated by the torque of the roller, and a friction clutch provided rotatably on the center shaft and associated with the carrier for swinging the carrier until one of the pair of wheels touches the ground.

6 Claims, 7 Drawing Sheets

STRETCHER MOUNTING UNIT

BACKGROUND OF THE INVENTION

1. Field of the Invention

This invention relates to a stretcher mounting unit which can be readily attached to and detached from a stretcher to be used in carrying a patient at sites of medical care such as hospitals and other medical nursing facilities.

2. Description of Prior Art

Conventional stretchers which are used for carrying patients, invalids, etc. at sites of medical care such as hospitals are not provided with a power device for travel motion, and are usually moved by artificial motive power. Thus, these conventional stretchers have cast a heavy burden on men or women of the nursing force.

Heretofore, motor-driven medical beds and motor-driven wheelchairs have been in use. These bedsand wheelchairs are highly expensive because they incorporate internal mechanisms, motors, and electric power sources in their main bodies. These beds and wheelchairs purchase entail enormous cost because they must be procured as new products one by one.

The development of a motor-driven stretcher, among other types of stretchers, has a residual problem in terms of cost. Even at present, substantially all sites of medical care, such as premises of hospitals, use stretchers relying solely on artificial power to carry patients, invalids, etc. Such is a true state of affairs.

Generally, the carriage of a patient by the use of a stretcher is inevitably performed, more often than not, by one person. The combined weight of the stretcher itself and the patient laid thereon averages in the approximate range of 80–150 kg. The carriage of this weight by just one nurse has been found to be very hard labor.

Especially, the carriage of a patient or an invalid with a stretcher on a winding passageway, a sloped passageway which changes in level, or a long corridor has demanded still greater man-power. At times, the carriage of the patient has required extra help.

Most conventional stretchers have four freely rotatable castors fixed thereto, to touch the ground in order to produce a small turning circle while in use. Such a stretcher, while in service, is prone to produce an instable travel because the individual castors thereof often randomly assume directions different randomly from the direction of travel of the stretcher. Thus, the conventional stretchers have been deficient in the ability to produce a translatory motion, and the casters thereof are unstable during a turning motion of the stretcher, Since the carriage of a patient or an invalid with a conventional stretcher has inflicted great pain on the nurse as described above, the desirability of relieving the nurse of this pain by offering a stably operating, inexpensive stretcher which avoids inflicting an undue burden on the user has been finding enthusiastic recognition.

This invention has been produced in light of the true state of prior art described above. It is an object of this invention to relieve the medical personel of the burden incurred in the carriage of patients, by providing a stretcher mounting unit which allows a reduction in the power necessary for the carriage of patients, enjoys a satisfactory operation, and avoids adding to cost.

SUMMARY OF THE INVENTION

To accomplish the object mentioned above, the stretcher mounting unit of this invention comprises a unit body detachably mounted on a stretcher; drive means attached to the unit body for providing an output; operating means detachably mounted on the stretcher for operating the drive means; a center shaft for receiving the output of the drive means; a coupling that couples the drive means and the center shaft for transmitting the output of the drive means to the center shaft; a roller pressed on the center shaft to produce torque; a carrier swingably disposed on the center shaft; a pair of wheels rotatably mounted on the carrier and rotated by the torque of the roller; and a friction clutch rotatably provided on the center shaft and associated with the carrier for swinging the carrier until one of the pair of wheels touches the ground, whereby the output of the drive means, upon the one wheel touching the ground, is transmitted to the one wheel to idly rotate the friction clutch relative to the center shaft and enable the stretcher to attain a self-advancing travel.

Further, the unit body can be removably fixed to the stretcher. The stretcher may well be provided near its pressure gripping part with a removable operating panel for operating the stretcher mounting unit.

The above and other objects, features and advantages of the present invention will become apparent from the description made with reference to the accompanying drawings.

DETAILED DESCRIPTION OF THE INVENTION

Figure 1:
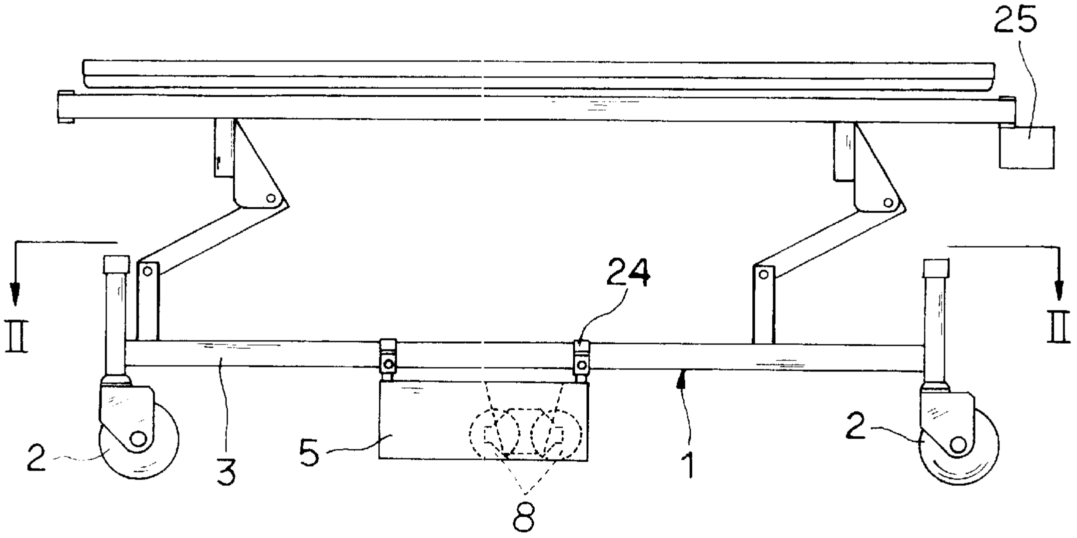
FIG. 1 is a front view illustrating a stretcher mounting unit of this invention in a fixed state.
Figure 2:
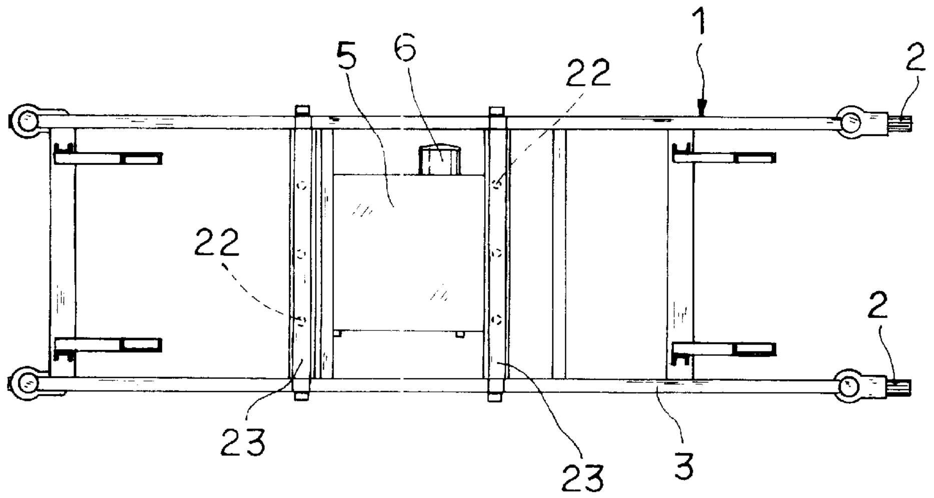
FIG. 2 is a cross section taken through FIG. 1 along the line II—II.
Figure 3:
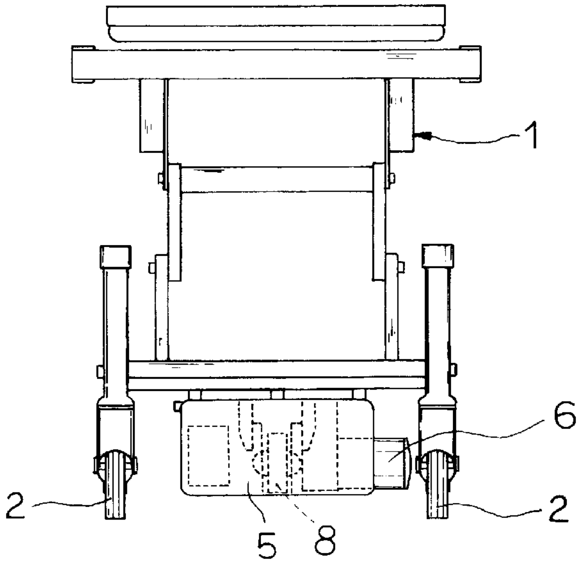
FIG. 3 is a right side view of FIG. 1.

One embodiment of a stretcher mounting unit according to this invention will be described by reference to the accompanying drawings.

In the drawings, reference numeral 1 stands for a stretcher main body, numeral 5 for a unit body, numeral 24 for an engaging piece, and numeral 25 for an operating panel.

Figure 4:
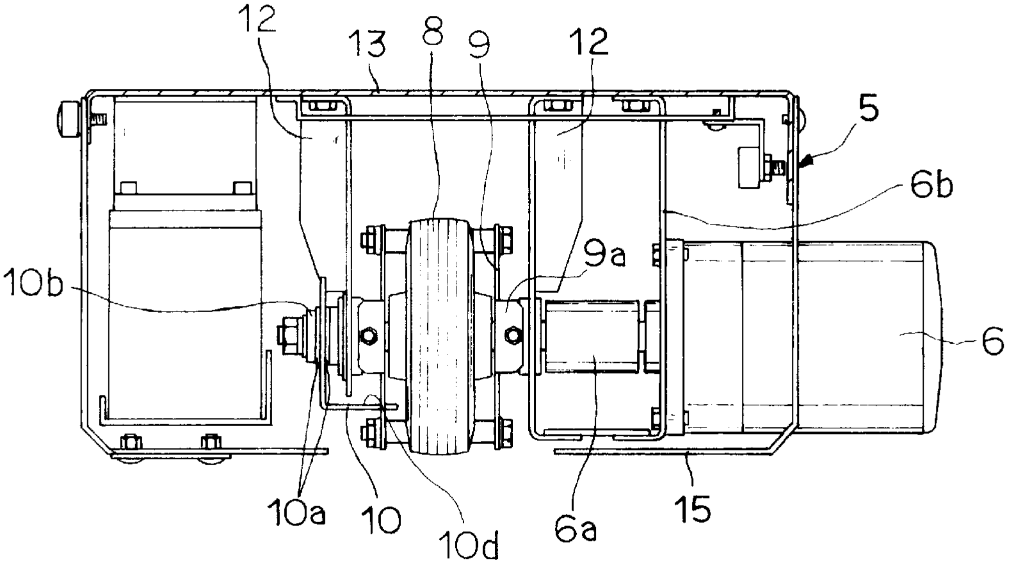
FIG. 4 is a right side view illustrating a unit body of the stretcher mounting unit of this invention.

As shown in FIG. 4, the unit body 5 comprises an electric motor 6 attached to a motor bracket **6*b*, a coupling 6*a* for transmitting the output of the electric motor 6, a center shaft 7 (FIG. 5) serving as a drive shaft for transmitting the output of the electric motor 6 to a pair of wheels 8 while concurrently fulfilling the function as a center shaft for rotating the wheels 8, a urethane roller 7***a* (FIG. 5) adapted to be pressed on the center shaft 7 and enabled to transmit torque to the wheels 8 by virtue of frictional force, and a carrier 9 disposed rotatably on the center shaft 7 through bearings 9*a*.

Figure 5:
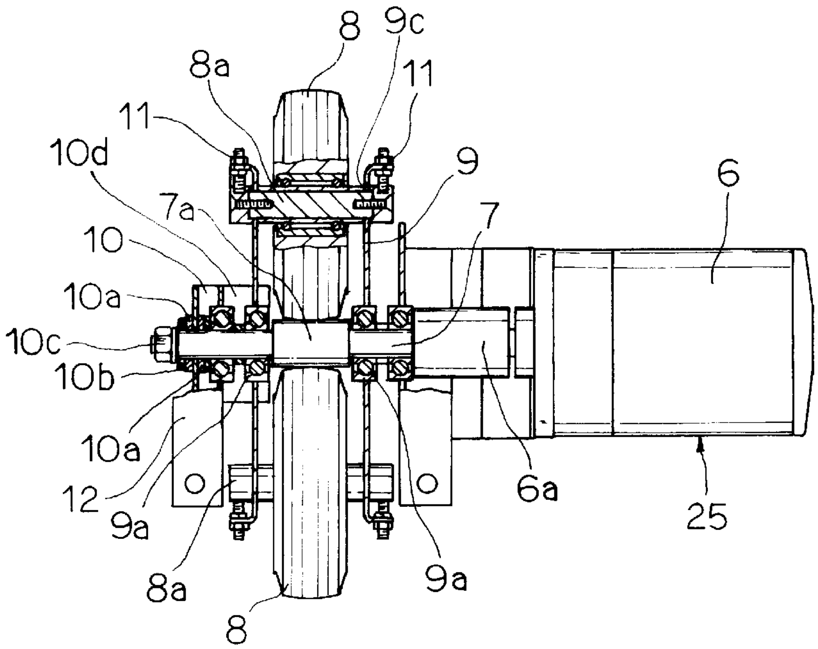
FIG. 5 is a plan view illustrating the internal construction of FIG. 4.

As shown in FIG. 5, a pair of wheels 8 are mounted on the carrier 9, and are movable toward the axis of the center shaft 7. These wheels 8 are held in contact with the urethane roller 7*a*, and adapted to be rotated by the torque from the urethane roller 7*a*.

Figure 6:
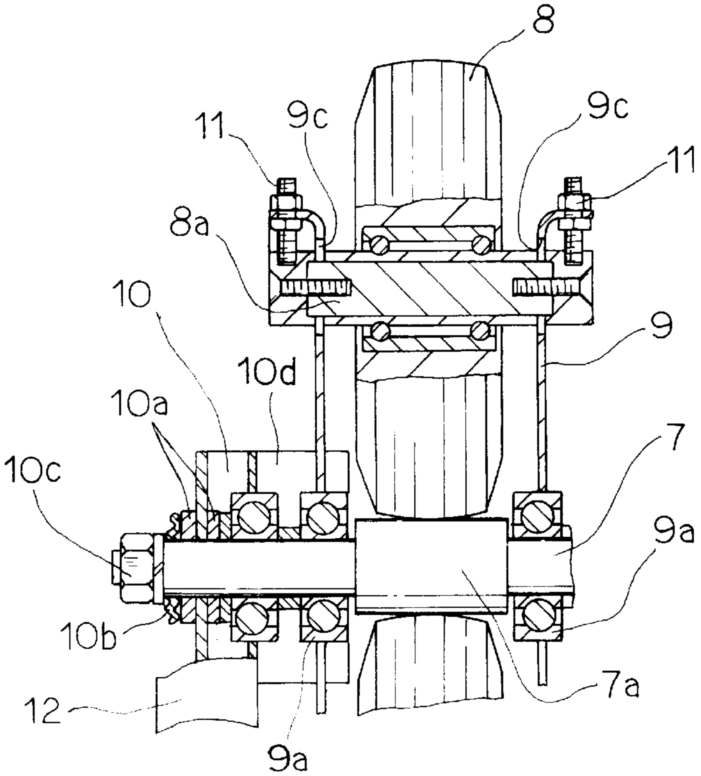
FIG. 6 is a partially cutaway enlarged view of FIG. 5.

As illustrated in FIG. 6, the carrier 9 is provided near the leading end thereof with setscrews 11. The regulation of the tightness of these setscrews 11 causes center shafts 8*a*, supporting the centers of the wheels 8, to be movably adjusted within adjustment holes 9*c* toward the center shaft 7, and permits adjustment of the pressing force of the wheels 8 exerted on the urethane roller 7*a* so that the torque from the urethane roller 7*a* can be easily transmitted to the wheels 8.

The center shaft 7 is provided near the leading end thereof with a friction clutch 10 having an L-shaped cross section and being pivotally supported on the center shaft 7 by constraing the clutch 10 between inner and outer thrust washers 10*a* made of an oilless bearing material. A bolt passes, through the washers 10*a,* and a wave washer 10(*b*) is attached to and thrust against the outer thrust washer 10*a* via rotation of nut 10*c*. The center shaft 7 is supported, in conjunction with the carrier 9 having the wheels 8 incorporated therein by a main bracket 12, through the bearings 9*a*. The component parts mentioned above are fixed to a base plate 13.

Besides the component parts mentioned above, the unit body 5 is provided with a battery as a power source, a main power source switch, a control unit for controlling the electric motor 6, a speed adjusting knob, and a connecting socket for charging the battery, which are not shown in the diagrams. These component parts are concealed with a cover 15 (FIG. 4) and fixed to the base plate 13.

Figure 13:
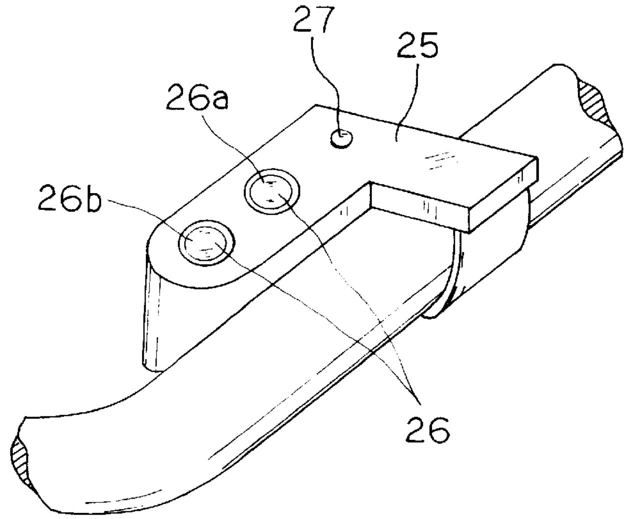
FIG. 13 is a perspective view illustrating a display panel.

As shown in FIG. 13, the operating panel 25 is intended to operate the unit body 5, and is installed in proximity of a point which the nurse grips in carrying the stretcher main body 1. The operating panel 25 is provided with a travelling button 26 consisting of an advance button 26*a* and a reverse button 26*b*, for moving the stretcher main body 1 forward and backward. The information as to the state of the movement, the remainder of service life of the battery, etc. is shown for inspection by a light emitting diode (LED not shown) in a display part 27. The display part 27 is connected to the unit body 5 with a control cable (not shown) which is fitted with a connector.

When the display part 27 indicates that the battery in the unit body 5 has been consumed to a point where the remainder of charge is running short, the battery is charged with an external battery charger (not shown).

Now, the actual behavior and the function of the stretcher mounting unit will be described below.

The travel of the unit body 5 is made possible by setting an arbitrary speed, by regulating the speed adjusting knob and turning on the main power source switch.

Since the speed regulating knob and the main power source switch are disposed on the unit body 5, and since the unit body 5 is positioned beneath the stretcher main body 1, these component parts are prevented from malfunctioning owing to otherwise possible contact with a human body.

A push given to the travelling button 26 starts the travel of the stretcher. The stop of the travel is simply effected by releasing the travelling button 26.

The LED of the display part 27, by displaying a red light indicating that the battery is in need of charging, informs the of the time for charging the battery during the course of operation.

When the travelling button 26 is pushed, the stretcher main body 1 will not suddenly start and, during the start of the travel of the stretcher, the patient or the invalid laid on the stretcher for carriage will not suffer an unpleasant feeling. The reason for this unique performance is that the speed of the rotation of the electric motor 6, which is started in response to the push given to the travelling button 26 is gradually increased for the sake of safety. The stretcher can be smoothly started even when the rotational speed of the electric motor 6 happens to be set at a high level through the operator's negligence in regulating the speed adjusting knob, for example.

Figure 7:
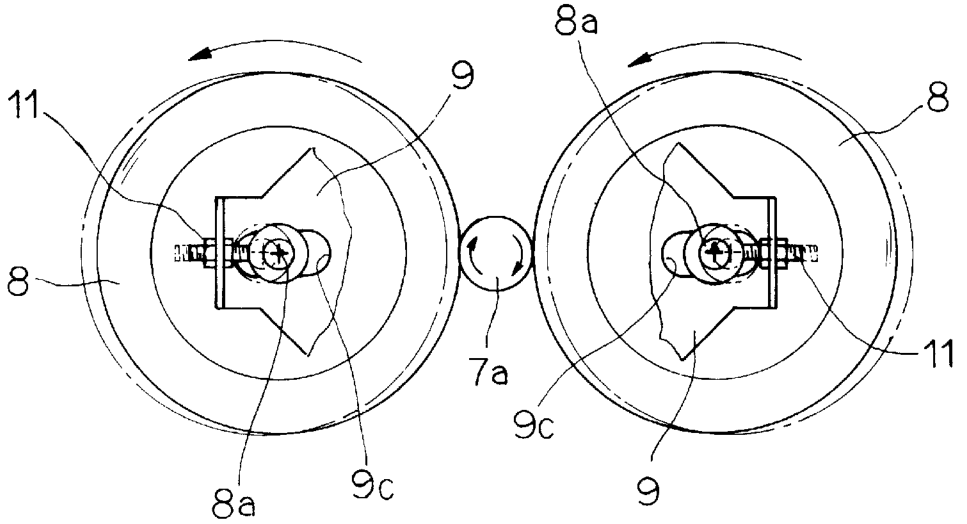
FIG. 7 is an explanatory diagram illustrating the rotation of wheels.

When the advance button 26*a* is depressed and the electric motor 6 is consequently set rotating, the wheels 8 held in contact with the urethane roller 7*a* are rotated counterclockwise as shown in FIG. 7, and the torque of the electric motor 6 is transmitted to the center shaft 7, resulting in swinging of the carrier 9 through the friction clutch 10.

Since the friction clutch 10 is so constructed that its bent part 10*d* (FIG. 4) is inserted into a square through hole 9*b* (FIG. 8) formed in the carrier 9, the rotation of the center shaft 7 induces a friction force on the thrust washers 8. This friction force that is transmitted to the wave washer 10*b* and the friction clutch 10 to rotate the friction clutch 10 and move the carrier 9. Thus, the carrier 9 swings above the center shaft 7.

Figure 8:
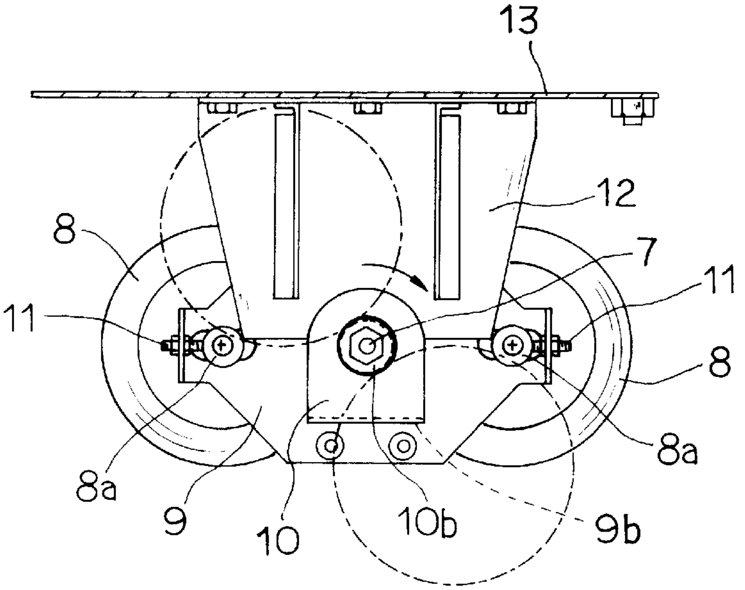
FIG. 8 is an explanatory diagram illustrating the wheels in a stopped state.
Figure 9:
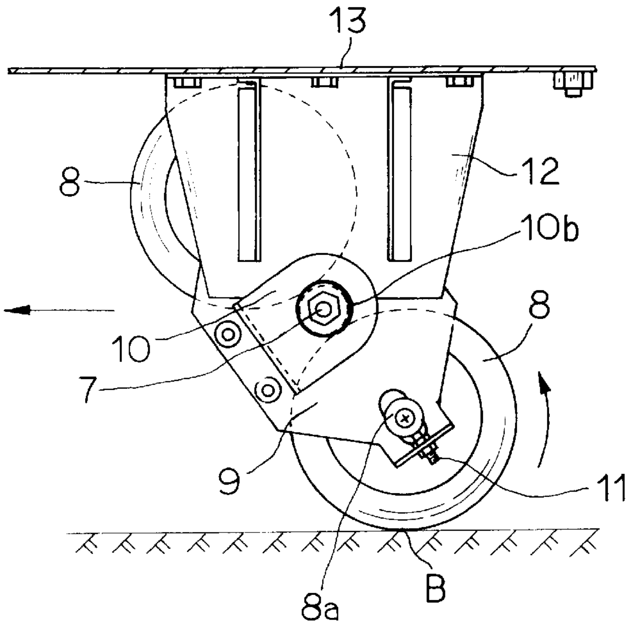
FIG. 9 is an explanatory diagram illustrating the wheels in a state assumed during operation.

The carrier 9 continues to swing around the center shaft 7 in the direction shown by the arrow in FIG. 8 until a wheel 8 touches the ground surface B as shown in FIG. 9, and thereafter, the friction clutch 10 is configured to produce an idle rotation relative to the center shaft 7. At this time, the friction clutch 10 can be protected and prevented from friction by the thrust washers 10*a*, which are of a bearing material.

Though the slide of the friction clutch 10 on the center shaft 7 causes no hindrance to the travel of the stretcher, it induces a slight loss of torque. As a measure to prevent this loss of torque, the resilient pressing force of the wave washer 10*b* may be eliminated by using a solenoid, for example, in the place of the wave washer 10*b*.

After the wheel 8 has touched the ground surface B, since the stretcher main body 1 is set moving and the swing of the carrier 9 is stopped, nearly all the torque of the electric motor 6 is consumed as the motive power for rotating the wheel 8.

The stretcher main body 1 can travel automatically without requiring exertion of an additional external force onto the wheel 8, because the rotation of the center shaft 7 is transmitted to the wheel 8 in the state of FIG. 9.

Incidentally, by using a solenoid in place of the wave washer 10*b,* it is possible to vary the frictional force produced during the pressure contact of the thrust washer 10*a*. It is also with the friction clutch 10 possible to adjust the torque of the center shaft 7 to an arbitrary torque, which is transferred to the friction clutch 10 to enable the pressure of a relevant wheel 8 against the ground surface B to be varied.

When the reverse button 26*b* is depressed, the stretcher main body 1 moves backward because the electric motor 6 rotates in the direction reverse to the direction of the rotation produced when the advance button 26*a* is depressed. During the backward travel of the stretcher main body 1, the driving force is obtained as stably as during the forward travel because the component parts of the travelling unit body 5, such as the wheels 8, the carrier 9, and the friction clutch 10 are positioned in the longitudinal direction symmetrically across the center shaft 7.

As the travelling button 26 is turned off to stop the rotation of the electric motor 6, the stretcher main body 1 is enabled to travel solely on free wheels 2, and therefore, operate in the same manner as the standard stretcher. This is so because the wheels 8 stop rotating and, at the same time, the interface between the wheels 8 and the urethane roller 7*a* disposed on the center shaft 7 ceases to generate flexure and exerts a repulsive force on the ground surface B, whereby the wheels 8 come away the ground surface B.

When the positions at which the wheels 8 are stopped, response to the stop of the rotation of the electric motor 6, are required to assume a mutually horizontal state, this requirement is fulfilled by providing the unit body 5 with a detector such as a sensor or a microswitch. The horizontal position of the carrier 9 is detected by means of this detector, and the horizontal position can be finely adjusting with a minute rotation of the electric motor 6.

Figure 12:
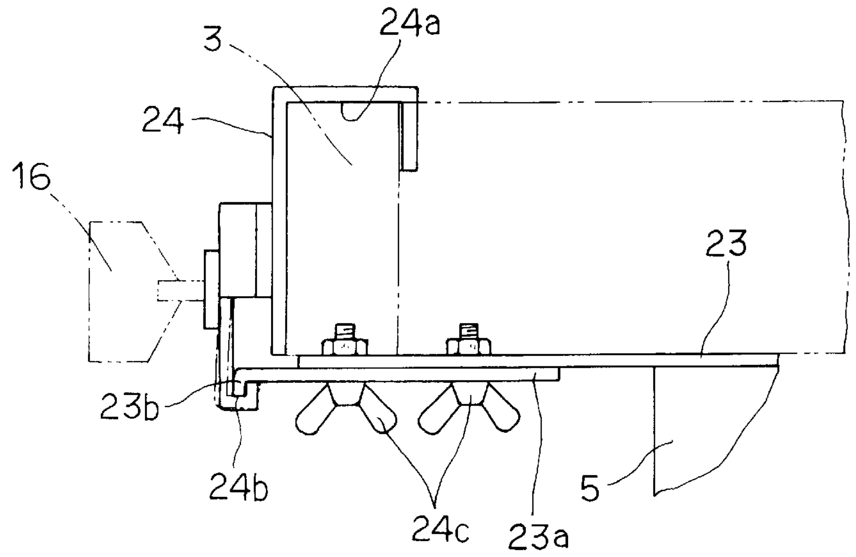
FIG. 12 is a partially cutaway enlarged view of FIG. 10.

The attachment of the unit body 5 to the stretcher main body 1 is accomplished by fixing a cross beam 23 to the unit body 5 with a fixing screw 22 (FIG. 10), fixing a metal piece 23*a* to the cross beam 23 with a fixing screw 24*c* (FIG. 12), and mounting an engaging piece 24 on the stretcher main body 1 (FIG. 1). Since each of the cross beam 23 and the metal piece 23*a* is exchangeable for others of different sizes, it is possible to fix the unit body 5 to the stretcher main body 1 of any conceivable type by providing appropriately sized cross beams 23 and metals each of various types, depending on the size and kind of the stretcher main body 1.

Figure 11:
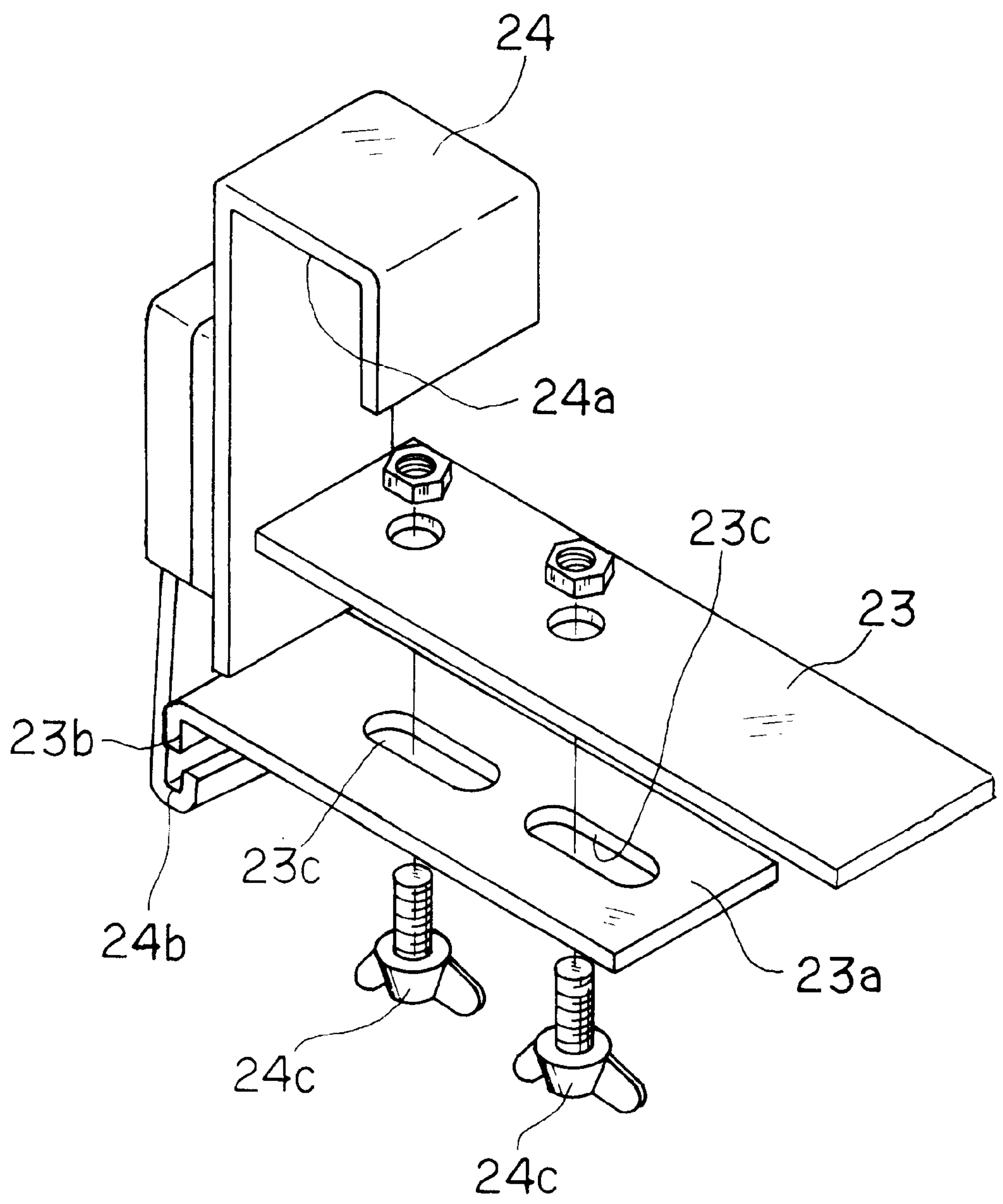
FIG. 11 is an explanatory diagram illustrating a connecting part of the unit body.

Reference numeral 23*c* in FIG. 11 represents a long hole which allows adjustment of the position at which the metal piece 23*a* is fixed to the cross beam 23.

The unit body 5 can be mounted on the stretcher main body 1 by engaging an engaging part 24*a* of the engaging piece 24 with a pipe frame 3 of the stretcher main body 1, subsequently a fixing part 24*b* of the engaging piece 24 to coupled to an engaging piece 23*b* of the metal piece 23*a* and finally a fixing tool 16 is used to tighten the engaging piece 24, through a tightening hole (not shown) bored in the engaging piece 24.

The engaging piece 24 causes the fixing part 24*b* to be strongly inserted onto the engaging piece 23*b* of the metal piece 23*a* because it normally resiliently urges the fixing part 24*b* outward by virtue of an internal resilient member (not shown) thereof and after being tightened with the fixing tool 16, the engaging piece urges the fixing part 24*b* inward.

When the unit body 5 is required to be fixed completely to the stretcher main body 1, this requirement is fulfilled by a method of directly adhering or welding the cross beam 23 to the pipe frame 3 of the stretcher main body 1.

Figure 10:
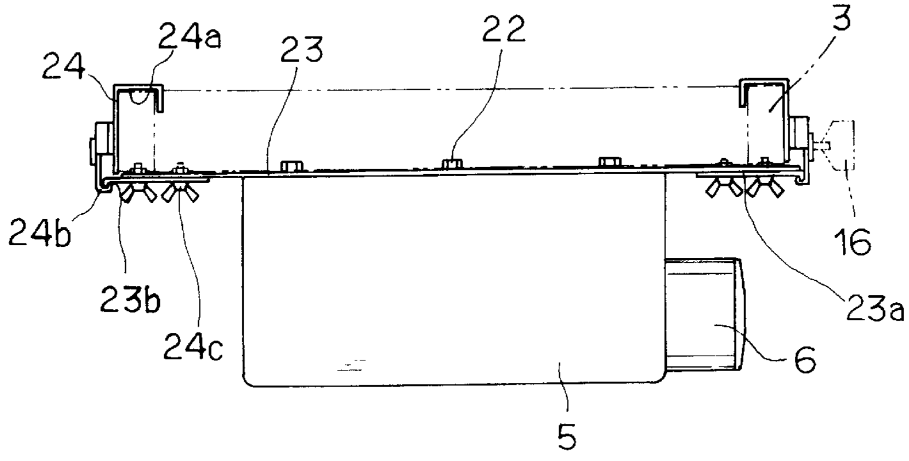
FIG. 10 is a cross section illustrating the unit body in a fixed state.

In the present embodiment, since the unit body 5 is fixed to the pipe frame 3 of the stretcher main body 1 by the engaging piece 24, since the engaging part 24*a* of the engaging piece 24 is barely held in contact with the pipe frame 3 as shown in FIG. 10, and since the fixed part 24*a* requires no extra space, the other functions of the stretcher will not be obstructed. When a superposing net (not shown) is installed in the neighborhood of the lower part of the stretcher main body 1, the installation will not be obstructed. In addition, the elevating function of the stretcher main body 1 will not be obstructed.

Since the engaging piece 24 is capable of being fixed to an arbitrary position of the pipe frame 3, the unit body 5 can be disposed at any necessary location of the stretcher main body 1.

When a cushioning material (not shown) such as sponge rubber is disposed at a site of contact between the engaging part 24*a* and the pipe frame 3, it enables the engaging part 24*a* to be strongly fixed to the stretcher main body 1 while preventing slippage of the part 24*a* relative to the main body 1 and, at the same time, enables the pipe frame 3 and the part 24*a* to be fixed to one another while absorbing a dimensional error in the part 24*a,* if any.

Since the travel of the stretcher main body 1 is aided by the rotation of the wheels 8 and further since the choice between the forward travel and the reverse travel is readily attained by switching the advance button 26*a* and the reverse button 26*b*, the nurse is only required to devote herself to steer the stretcher main body 1 and is not required to exert so much force in pressing the stretcher main body 1 and, therefore, is kept from shouldering a burden.

The stretcher contemplated by this invention enjoys highly satisfactory stability in the motion of straight advance because it has the wheels 8 disposed in a fixed direction, whereas the conventional stretcher relies solely on the four castors and consequently betrays, during the course of travel, its lack of the ability at straight advance and brings such disadvantages as producing an oblique advance or a zigzagging motion and incurring great hardship in obtaining as much advance as expected.

In the case of producing a gyrating motion, the stretcher exhibits an exalted gyrating property and a marked improvement in the steering property because one of the wheels 8 has a fixed center of gyration, because the wheel 8 discharges this role of the point of center of the stretcher main body 1, and further because the remaining free wheels 2 have freedom of rotation.

When the ground surface B is inclined like an ascending slope or a descending slope, the stretcher is capable of effecting a self-advancing travel so long as the slope is within the range of the gradability of the electric motor 6. Even when the slope has a still greater inclination, the nurse serves as an auxiliary motive force for the carriage of the stretcher. Incidentally, the electric motor 6 in the present embodiment has a gradability of about 4° under a load of about 150 kg.

In the case of carrying the stretcher on a descending slope, the present stretcher mounting unit can be used as a braking device. When the descent of the stretcher to be effected on a slope is prepared, for example, by switching the travelling button 26 to turn on the reverse button 26*a*, thereby causing the wheel 8 on the reverse side of the travelling unit body 5 to land on the ground surface B and allowing the stretcher main body 1 to be advanced backward, the stretcher is enabled to descend the slope gradually because the torque of the electric motor 6 is directed opposite the direction of advance, and consequently is permitted to produce a braking function relative to the direction of advance.

When the stretcher is moved in a place having a stepped level, as when it is boarding or alighting from an elevator cage, or when it is moved in a place having an undulating ground surface B, it attains easy passage across such differences in level because the oscillates along the undulation of the ground surface B, and the wheels 8 roll along the ground surface B. The passage across the differences in level is also easy because the stretcher is capable of transferring a stable drive force to the ground surface B.

When the unit body 5 is to be switched between stretchers that are different in size and kind, it can be readily fixed to a new stretcher by simply exchanging the cross beam 23, the metal pieces 23*a*, and the engaging piece 24 for another cross beam, metal pieces and engaging piece respectively. Even when necessity arises for removing the unit body 5 for the sake of maintenance, for example, the removal can be attained readily without requiring removal of the engaging piece 24 from the stretcher main body 1, because the coupling of the fixing part 24*b* and the engaging piece 23*b* is broken by loosening the engaging piece 24 relative to the tightening hole by the use of the fixing tool 16.

Since the unit body 5 is an auxiliary travelling unit which can be attached to any stretcher now used, it is available at a lost cost.

The operating panel 25 is disposed removably in proximity of a point which the nurse grips in carrying the stretcher main body 1. This operating panel is easy to observe and simple to use because it has the travelling button 26 and display part 27 set integrally in place and near at hand.

The stretcher mounting unit of this invention does not need to limit the object for fixation only to the stretcher. It can be used, for example, in a wagon for carrying meals or in a cart for transporting loads in a factory. In business activities other than the activities of medical care, it can alleviate the burden shouldered by workers engaging in carriage and transport.

It is evident from the description given above that the stretcher mounting unit of this invention brings such outstanding advantages as allaying the operating force needed in the carriage of a stretcher, exhibiting a highly satisfactory travelling property, limiting the cost, excelling in the ease of operation, and alleviating the burden on medical personnel.

What is claimed is:

1. A stretcher mounting unit comprising:

a unit body detachably mounted on a stretcher;

drive means attached to said unit body for providing an output;

operating means detachably mounted on the stretcher for operating said drive means;

a center shaft for receiving the output of said drive means;

a coupling that couples said drive means and said center shaft for transmitting the output of said drive means to said center shaft;

a roller pressed on said center shaft to produce torque;

a carrier swingably disposed on said center shaft;

a pair of wheels rotatably mounted on said carrier and rotated by the torque of said roller; and a friction clutch rotatably provided on said center shaft and associated with said carrier for swinging said carrier until one of said pair of wheels touches the ground;

whereby the output of said drive means, upon said one wheel touching the ground, is transmitted to said one wheel to idly rotate said friction clutch relative to said center shaft and enable the stretcher to attain a self-advancing travel.

2. The stretcher mounting unit according to claim 1, wherein said roller is made of urethane.

3. The stretcher mounting unit according to claim 1, wherein one of said pair of wheels is for advancing the stretcher forward and the other of said pair of wheels is for advancing the stretcher backward.

4. The stretcher mounting unit according to claim 1, wherein said unit body is detachably mounted on a pipe frame of the stretcher.

5. The stretcher mounting unit according to claim 1, wherein said operating means is detachably mounted in proximity of a point which an operator grips in carrying the stretcher.

6. The stretcher mounting unit according to claim 1, wherein said pair of wheels is movably mounted on said carrier to be held in contact with said roller so that the contact between said roller and said pair of wheels is adjustable.

* * * * *